United States Patent
Lu et al.

[11] Patent Number: 6,046,826
[45] Date of Patent: Apr. 4, 2000

[54] LIGHT SOURCE FOR FILM SCANNER

[75] Inventors: Sung-pi Lu; Jih-Yam Chen, both of Hsin-Chu, Taiwan

[73] Assignee: Avision Inc., Hsin-Chu, Taiwan

[21] Appl. No.: 08/917,163

[22] Filed: Aug. 25, 1997

[51] Int. Cl.[7] .............................. H04N 1/04; H04N 1/46; H01J 5/16
[52] U.S. Cl. .................... 358/475; 358/487; 358/509; 313/114
[58] Field of Search ...................... 358/475, 487, 358/509; 362/310, 297, 260, 241, 243, 247, 248, 303, 341; 313/114; 355/67

[56] References Cited

U.S. PATENT DOCUMENTS

| | | | |
|---|---|---|---|
| 3,198,982 | 8/1965 | Benson et al. | 358/475 |
| 5,272,331 | 12/1993 | Bakker et al. | 358/475 |
| 5,844,697 | 12/1998 | Omvik et al. | 358/487 |

FOREIGN PATENT DOCUMENTS

| | | | |
|---|---|---|---|
| 2-224458 | 9/1990 | Japan | H04N 1/04 |
| 2-285338 | 11/1990 | Japan | G03B 27/54 |

*Primary Examiner*—Thomas D. Lee
*Assistant Examiner*—Wenpeng Chen
*Attorney, Agent, or Firm*—H. C.Lin Patent Agent

[57] ABSTRACT

A light source for scanning a transparent film is equipped with a light intensity adjustment plate inserted between a light reflector and a light slot. The light intensity adjustment plate is partially painted to absorb light, so that the stronger light from the parallel center section of a linear light is weakened to produce a more uniform light along the whole scanning length.

The light intensity adjustment plate can be placed between the U-shaped light tube, or attached to the inner wall of the U-shaped light tube housing. The light intensity adjustment plate can have a frame which is rectangular or concave. The light intensity adjustment plate can also have an shaped extension toward the light tube to produce more uniform light.

3 Claims, 8 Drawing Sheets

FIG.1

Up View

Left View    Right View

Top View    Bottom View

Down View

LIGHT SOURCE FOR FILM SCANNER

This invention is related to a light source for transparent film scanner.

BACKGROUND

Conventional light source for film scanner generally does not fully utilize the energy available. In this age of energy saving, it is important to provide an efficient light source.

Figure 5:
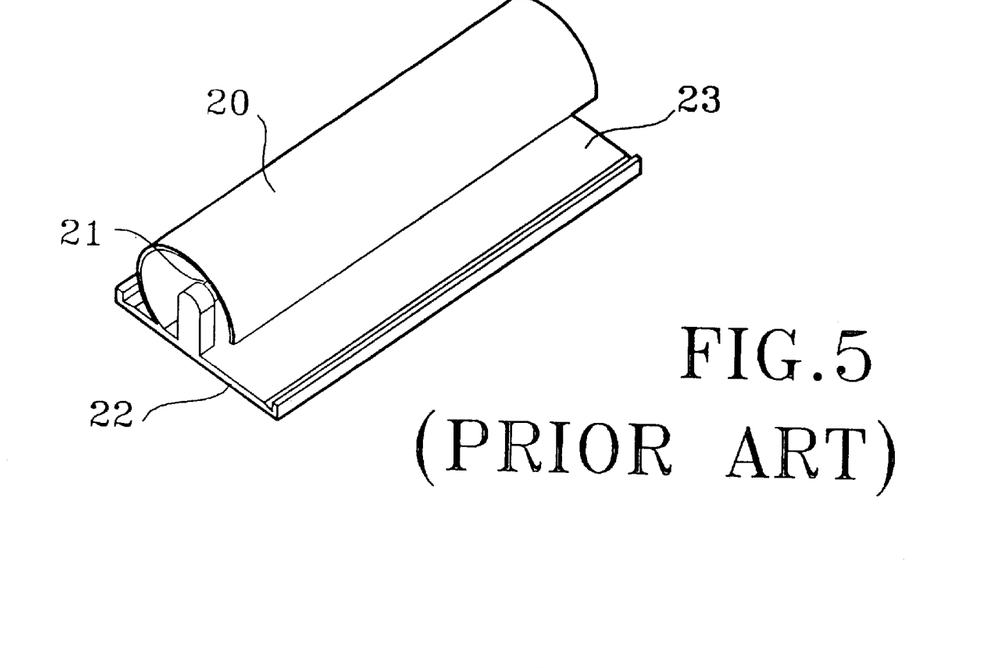
FIG. 5 shows a prior art.

FIG. 5 shows a design of the light source disclosed in Patent No. 309104 of the Republic of China in Taiwan. The light source is composed of a straight light tube 21, an arc-shaped cover 22 and a reflecting plate 23. A drawback of this design is that the arc-shaped cover blocks most of the light emitted from the light source. Only 1/5 to 1/6 of the light is utilized, thus wasting a great deal of energy.

SUMMARY

An object of this invention is to provide a more efficient light source for a film scanner. Another object of this invention is to provide a more uniform light source.

These objects are achieved in this invention by using a flat light slot instead of the arc-shaped cover to more fully utilize the light from the source 21. A light intensity adjustment plate is used to adjust the intensity of the light for the second time. The light intensity adjustment plate can be painted with dark color to adjust the light for the third time.

DETAILED DESCRIPTION OF THE PREFERRED EMBODIMENTS

Figure 1:
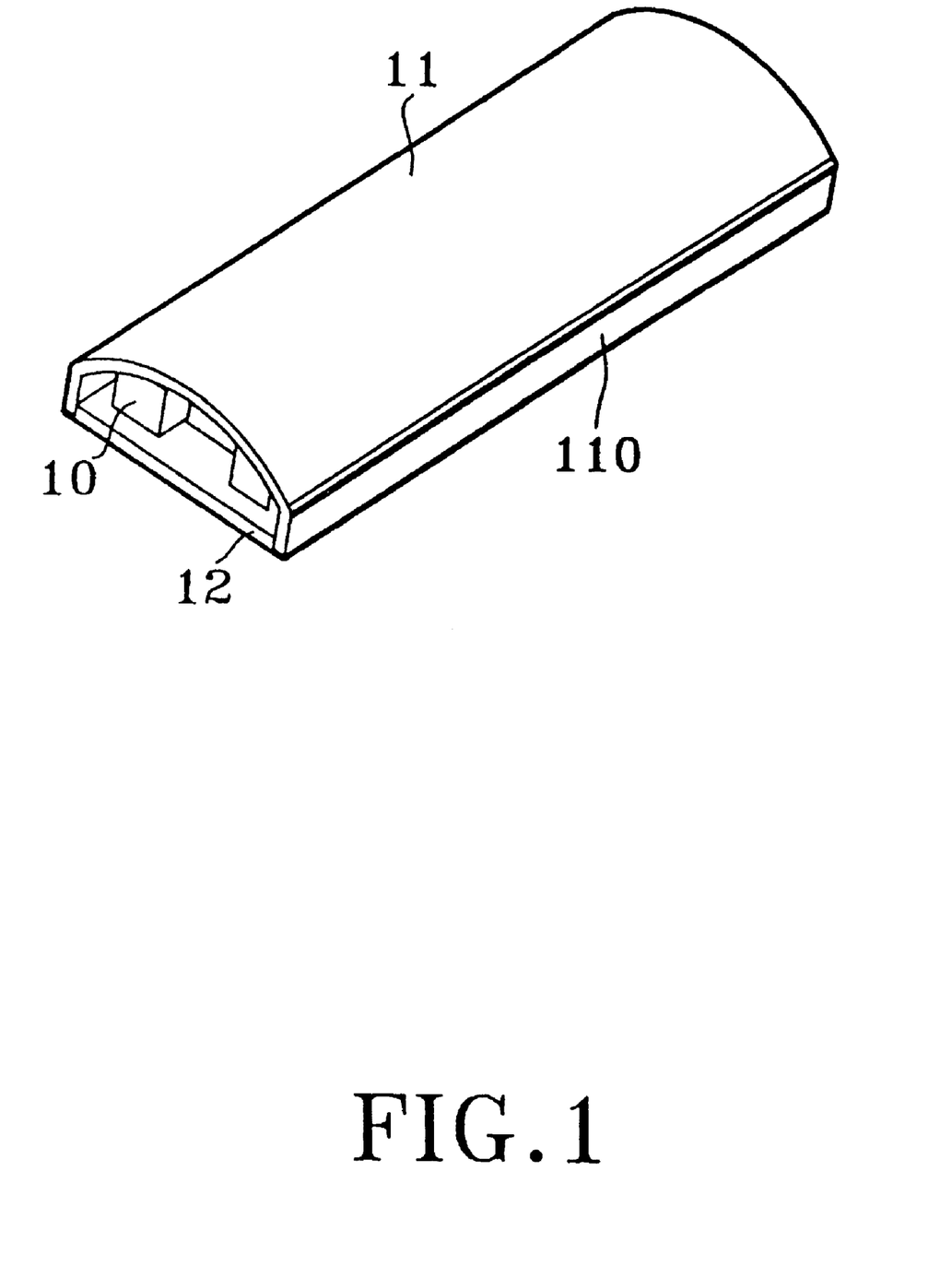
FIG. 1 shows basic component of the present invention.

FIG. 1 shows the shape of the present invention, containing a U-shape light tube 10, a base 12 and a cover 11, which also serves as a light reflector of the primary light from the tube 20 and produces a stronger secondary light. The two sides of the cover have two side walls 110 to allow space between the cover 11 and the base 12 for the installation of the U-shaped light tube 10. The cover may be partially painted to effect a more uniform secondary light. The U-shaped light tube may be replaced with two parallel linear light tubes.

Figure 2A:
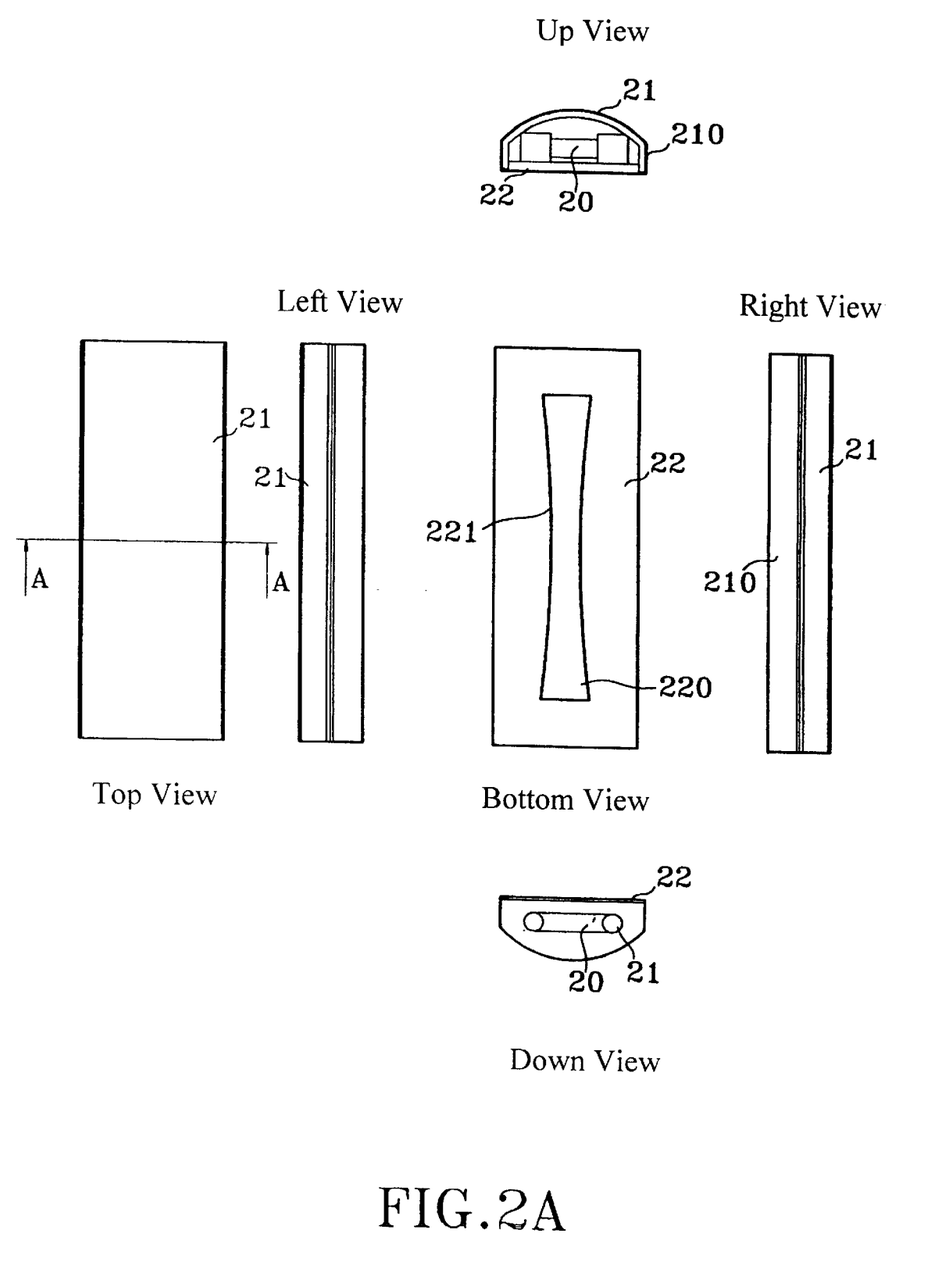
FIG. 2A shows six different views of the present structure.
Figure 2B:
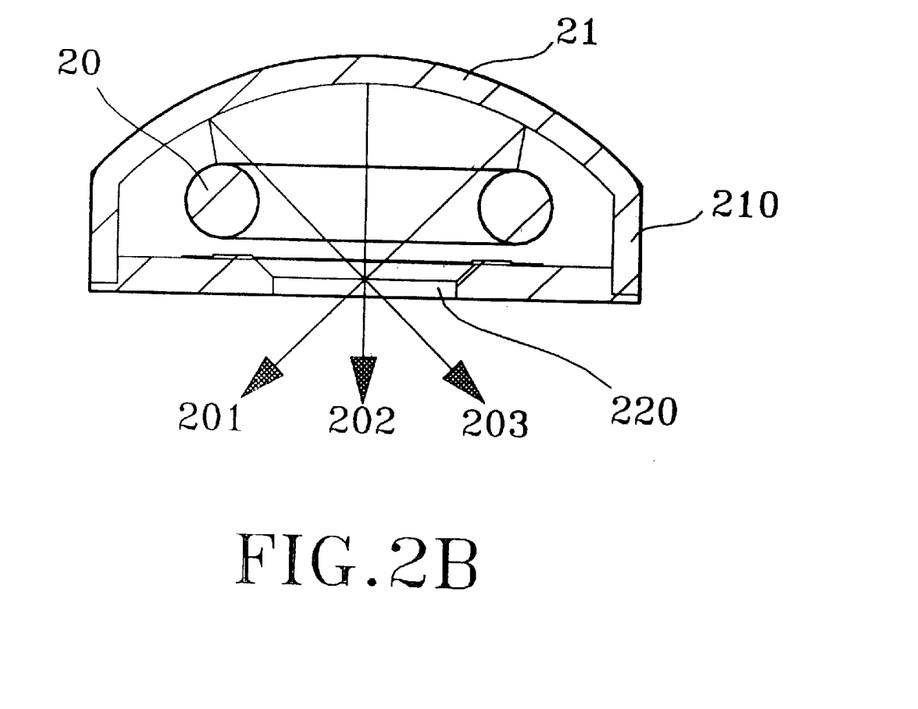
FIG. 2B shows the reflected rays.

FIG. 2A shows the six-sided views of the structure. Here the platform is shown as component 22; the light tube, component 20; and cover, component 21. The cover has reflecting capability to reflect the light from the light tube 20 as a stronger and more uniform secondary light. There are two walls 210 to support the cover 21 and to provide space between the cover 21 and the platform 22 for the placement of the U-shaped light tube 20. In the middle of the base is a cut 220 serving as light slot for the secondary light to pass through. Section A—A shows the light slot 220 relative to the light source 20 and the cover 21. FIG. 2B shows the arrow-headed paths of the light rays 201, 202, 203, which pass through the light slot to obtain a more uniform light intensity for scanning a film.

The light slot 220 has an elongated shape, which can be of rectangular shape or of concave shape as shown in FIG. 2A to adjust for more uniform light intensity, since the light paths of rays 201, 202 and 203 now arrive at the light slot at equal path lengths.

Figure 3:
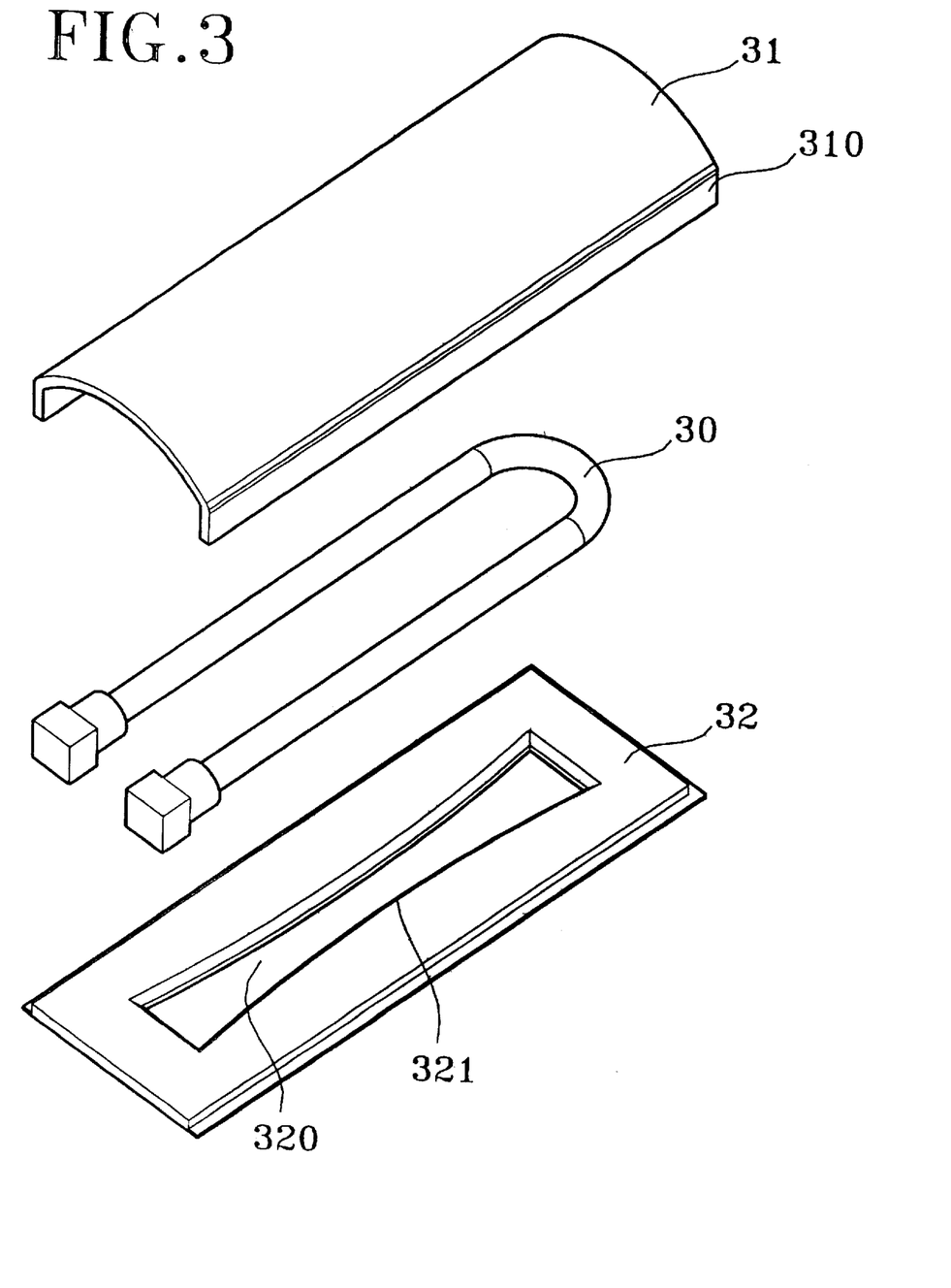
FIG. 3 shows the analysis of the present structure.

FIG. 3 shows an exploded view of the present invention. The figure shows a U-shaped light tube 30, a base 32 and a cover 31, which also serves as a light reflector for the light tube 30 to produce a stronger secondary light. The cover 31 is supported by two side walls 310 to provide space for the installation of the light tube 30. The base 32 has a cut 320 to serve as a light slot, which provides more uniform and stronger light.

Figure 4:
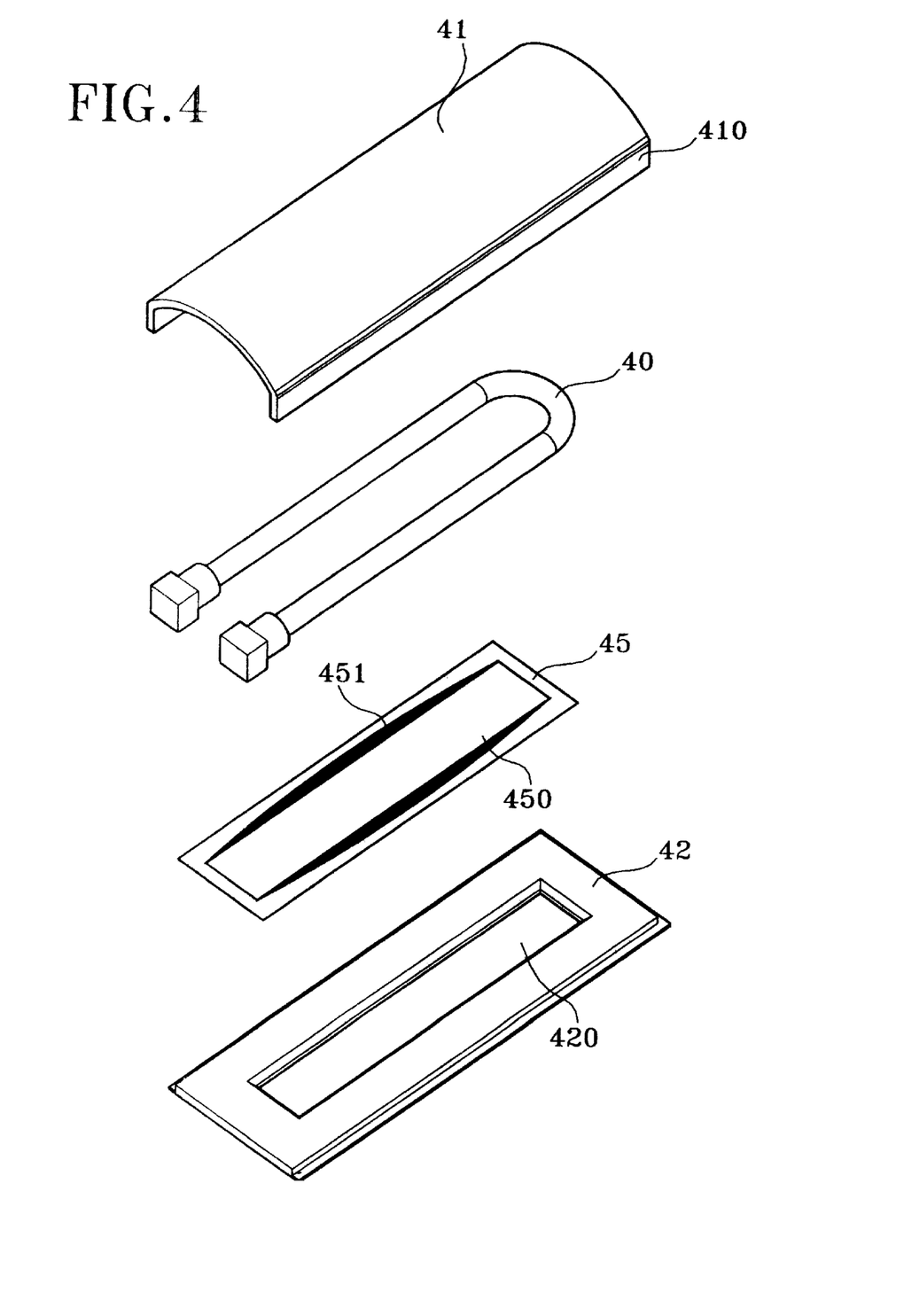
FIG. 4 shows the addition of a light intensity adjustment.

FIG. 4 shows another embodiment of the present invention. The structure includes a U-shaped light tube 40, a base 42, a cover 41, which also servers a light reflector to reflect the primary light form the light tube 20 into more uniform secondary light. The cover 41 is supported by two side walls 410 to provide space for the installation of the light source 40. In the center of the base is a cut 420 serving as a light slot to provide stronger and more uniform secondary light. This embodiment further includes a light intensity adjustment plate 45, which is inserted between the U-shape light tube 40 and the base 42 to adjust the uniformity of light. The light adjustment plate 45 is a frame with a light slot 450 in the middle. The center section 451 of the frame, where the parallel light intensity is stronger, is painted in dark color to absorb the stronger light. Thus the reflected light from the U-shaped light tube is partially absorbed by the dark color, and the light passing through the light slot becomes more uniform.

The light slot 420 can be rectangular as shown in FIG. 4 or convex (not shown) to reduce the stronger light intensity emitted from the parallel section of the light tube.

Figure 4A:
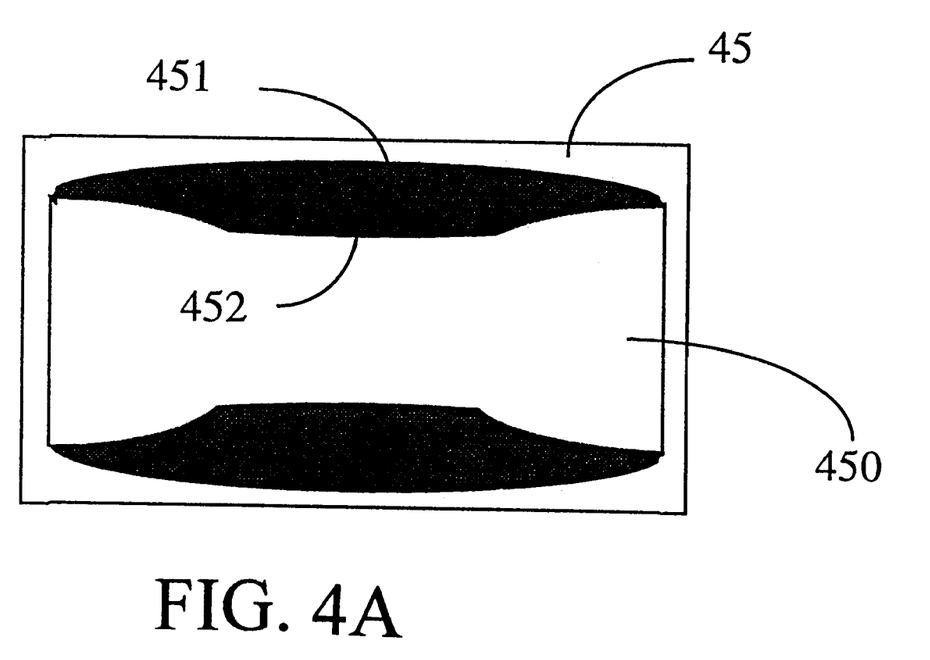
FIG. 4A shows another version

The light adjustment plate 45 can have a rectangular cut 450, or a concave cut or an extension 452, as shown in FIG. 4A, to make the middle section narrower and to compensate for the stronger light emitted from the parallel section of the light tube.

Figure 6:
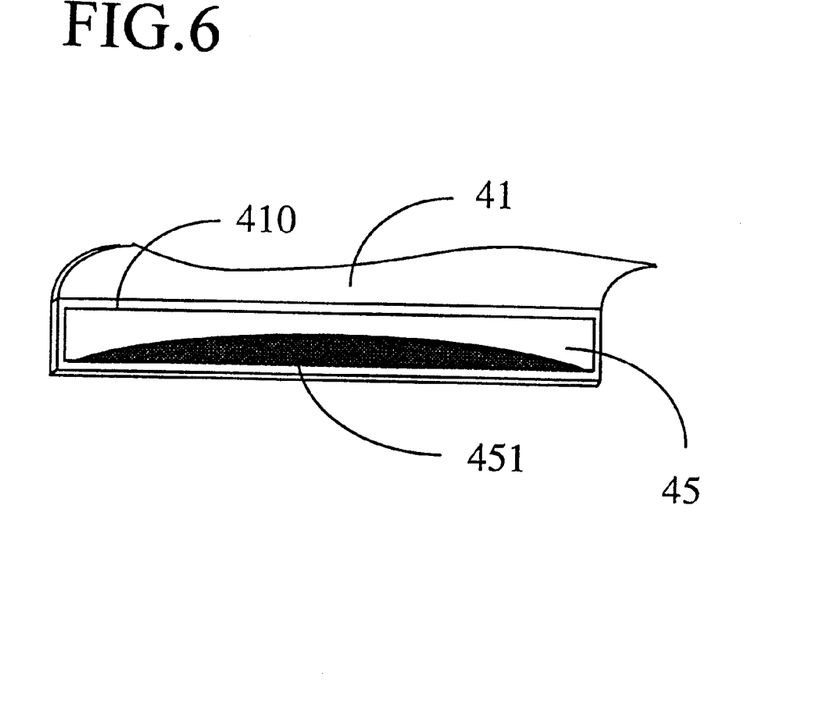
FIG. 6 shows a portion of the structure in FIG. 4.

FIG.6 shows a light intensity adjustment plate mounted on the side wall 410 supporting the cover 41. The dark color 451 convex sector can absorb the stronger light emitted from the parallel section of the U-shaped light tube 40 and make the light intensity more uniform.

Figure 7:
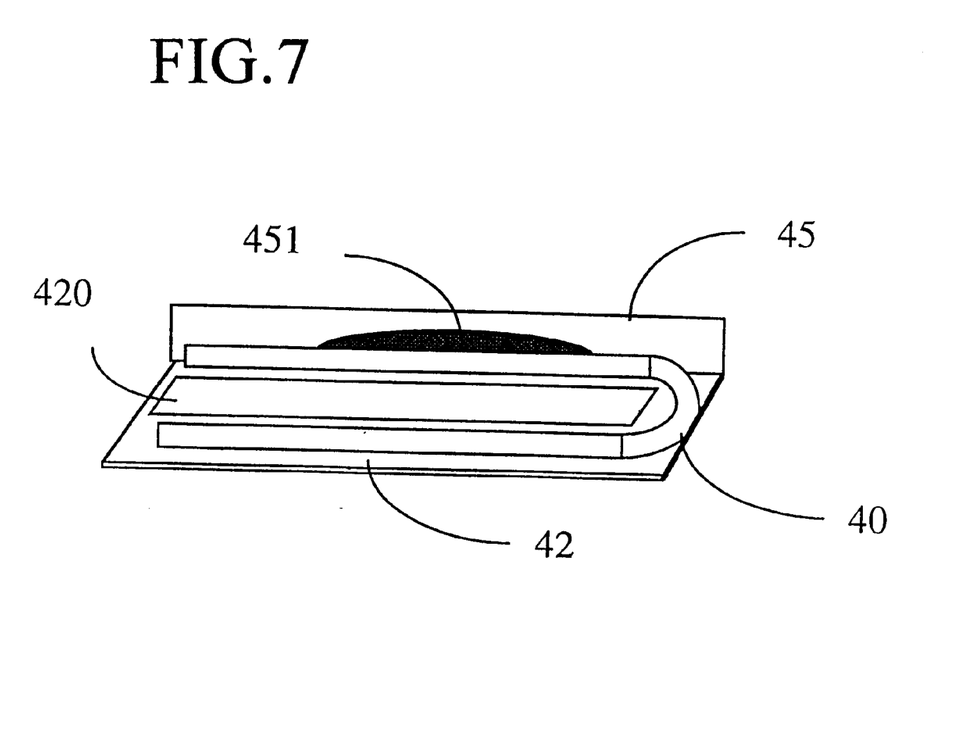
FIG. 7 shows another portion of the structure in FIG. 4.

FIG. 7 shows the side wall light intensity adjustment plate 45 with painted convex-sector 451 together with the U-shaped light source and the base 42.

Figure 8:
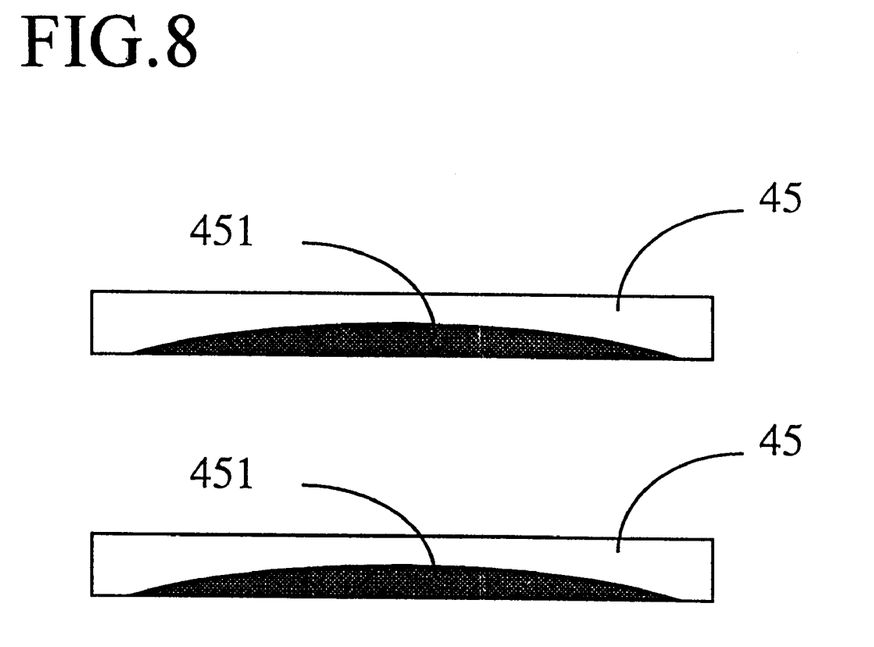
FIG. 8 shows the light intensity adjustment plate of the present invention.

FIG. 8 shows the use of side wall light intensity adjustment plate 45 with painted convex-sector 451 shown in FIG. 7 mounted on both side walls of the scanner.

Figure 9:
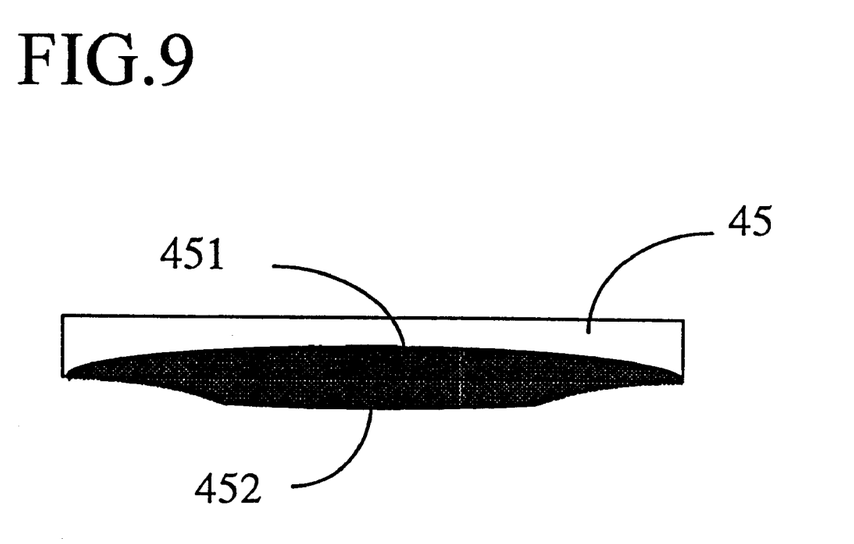
FIG. 9 shows another embodiment of the light intensity adjustment plate.

FIG. 9 shows the light intensity adjustment plate 45 used in FIG. 8 having a protruded part 452 extending toward the light slot shown in FIG. 4 to further weaken the light intensity in the middle section of light slot where the parallel light source is strongest, thus making the light intensity more uniform.

The foregoing descriptions are examples of the preferred embodiments of the present invention. The invention is by no means limited to these examples. Any equivalent techniques to achieve the function of this invention are all within the scope of this invention.

What is claimed is:

1. A light source for scanning a transparent film, comprising:

a light tube as primary light source;

a cover over said primary light source, serving to collect light from said primary light source to produce a secondary light and to protect said light tube from damage;

a base with side walls for supporting said cover and providing space to house said light tube, said base having a cut in the middle serving as a light slot, through which said secondary light passes;

at least one light intensity adjustment plate placed between said primary light source and said light slot and painted with light absorbing material on suitable area to adjust the light intensity of the light passing through said light slot, wherein said light intensity adjustment plate is placed on one side of said walls facing the primary light source.

2. A light source as described in claim 1 wherein said light intensity adjustment plate has a rectangular frame.

3. A light source as described in claim 1, wherein said light intensity adjustment plate has a concave frame.

* * * * *